US012293345B2

(12) United States Patent
Yepez et al.

(10) Patent No.: US 12,293,345 B2
(45) Date of Patent: May 6, 2025

(54) ACCESSIBILITY SELF-SERVICE TERMINAL (SST) WITH DEVICES AND MODULES FOR CUSTOM CONFIGURATIONS

(71) Applicant: NCR Voyix Corporation, Atlanta, GA (US)

(72) Inventors: Rafael Yepez, Duluth, GA (US); Philip Noel Day, Fife (GB); Daniel Robert Bateson, Sydney (AU); Levino Felix Perrucci, Mableton, GA (US)

(73) Assignee: NCR Voyix Corporation, Atlanta, GA (US)

( * ) Notice: Subject to any disclaimer, the term of this patent is extended or adjusted under 35 U.S.C. 154(b) by 189 days.

(21) Appl. No.: 17/941,727

(22) Filed: Sep. 9, 2022

(65) Prior Publication Data

US 2024/0086879 A1 Mar. 14, 2024

(51) Int. Cl.
*G06Q 20/18* (2012.01)
*G06F 3/041* (2006.01)

(52) U.S. Cl.
CPC ............ *G06Q 20/18* (2013.01); *G06F 3/041* (2013.01)

(58) Field of Classification Search
CPC ................................ G06Q 20/18; G06F 3/041
See application file for complete search history.

(56) References Cited

U.S. PATENT DOCUMENTS

| | | | | |
|---|---|---|---|---|
| 10,726,681 B1 * | 7/2020 | Durieux | ............... | G06F 3/0416 |
| 10,825,006 B2 * | 11/2020 | Taylor | .................... | G06Q 20/18 |
| 2013/0030998 A1 * | 1/2013 | Colley | .................... | G06Q 20/18 |
| | | | | 700/232 |
| 2015/0170239 A1 * | 6/2015 | Hamilton | ........... | G06Q 30/0613 |
| | | | | 705/26.41 |
| 2016/0063619 A1 * | 3/2016 | Smith | .................... | G06Q 20/40 |
| | | | | 705/44 |
| 2016/0078528 A1 * | 3/2016 | Pradeep | ................. | G06Q 20/18 |
| | | | | 705/39 |
| 2016/0321626 A1 * | 11/2016 | Rossmann | ............ | G06Q 40/02 |

OTHER PUBLICATIONS

A Study and Development of Workplace Facilities and Working Environment, Pruettikomen and Louhapensang, The Scientific World Journal, vol. 2018, Article ID 3142010, 12 pages, downloaded from https//doi.org/10.1155/2018/3142010. (Year: 2018).*

* cited by examiner

*Primary Examiner* — Fateh M Obaid
(74) *Attorney, Agent, or Firm* — Schwegman Lundberg & Woessner, P.A.

(57) ABSTRACT

A host device is included within a housing of a first peripheral; the host devices includes an internal connection within the housing to the first peripheral. Each composited integrated peripheral device includes two or more second peripherals. A combination of the host device, the composite integrated peripheral devices, standalone peripheral devices, and accessory modules is identified. Housings associated with the combination are attached to, placed on, or placed adjacent to one or more of the accessory modules of the combination. In an embodiment, accessory modules are arranged in a layout that defines a clearance area for custom access and the corresponding peripherals of the combination are connected to the host device. The host device processes self-service transactions for customers with disabilities using the corresponding peripherals and the accessory modules within the layout.

19 Claims, 7 Drawing Sheets

ACCESSIBILITY SELF-SERVICE TERMINAL (SST) WITH DEVICES AND MODULES FOR CUSTOM CONFIGURATIONS

BACKGROUND

Self Checkouts (SCOs) have always been designed to meet the needs of a typical shopper, while taking into account government regulations on usability and shopper accessibility. SCOs offer a wide range of functionality to shoppers, mostly through separate peripheral devices that are integrated into a single housing and provided as a bulky and space-inefficient standalone unit to retailers. Retailers rely on the SCO providers to ensure that the SCOs are compliant with local accessibility regulations, standards, and guidelines. Unfortunately, only the minimum standards defined by the regulations have to be complied with and the minimum is largely what the retailers are stuck with.

Retailers simply cannot afford, with low margins, to design and manufacture their own SCO units. Moreover, any retailer that attempted to do this would find the cost of manufacture prohibitive because the number of annual units manufactured would be extremely small such that nearly every unit produced would in effect be priced as a custom manufacture.

SUMMARY

In various embodiments, a self-service terminal (SST), a system, and a method for assembling devices and accessory modules in custom configurations that operate as a self-service terminal (SST) are presented. A variety of peripheral devices, integrated peripheral devices, and accessory modules are provided. A host device is included within a common housing of one the peripheral devices or a common housing associated with one of the integrated peripheral devices. The host device controls the peripheral devices to process self-service transactions at an SST using the accessory modules. Selectable ones of the peripheral devices and accessory modules are arranged in custom configurations to form an operational SST.

In an embodiment, the custom configurations provide accessibility to accommodate wheelchair access for disabled customers to perform self-service transactions at the SST. These custom configurations can also be beneficial for those who use walking aids. In addition, some of these configurations can offer benefits to blind and partially-sighted people and those with developmental issues, for whom the separation of the transaction area from the surrounding environment can help reduce anxiety when using the SST.

DETAILED DESCRIPTION

Conventional SCO units are manufactured and installed with substantial physical footprints and with minimal ability to be configured in layouts that would accommodate persons with disabilities. Additionally, retailers generally cannot customize their SCO units beyond just adding or removing peripheral devices. Also, any SCO customizations are not likely to improve the SCO's footprint nor are they likely to provide better physical layouts to accommodate disabled customers. Furthermore, even if a customized layout of a SCO can be achieved, the layout configuration work would likely require SCO support personnel on site to provide the layout because such work would most likely necessitate removing certain peripherals from the SCO housing, providing different peripherals that the retailer would have to purchase, reconnecting the peripherals, and/or updating software on the host device of the SCO. This is time-consuming, expensive, and the SCO unit is unavailable for customer transactions during the work.

Not all retailers need all of the peripheral devices that come packaged with a SCO unit. The ability to customize SCO units largely consists of adding or removing peripherals. However, such customizations do not address customer accessibility issues, nor do they decrease the physical footprint of the SCO unit. Moreover, customizations increase delivery and setup time lead time.

By and large, accessibility features of a SCO unit are designed to assist the hearing and sight impaired during self-service transactions. These accessibility features can include audio ports for headphones, speakers, microphones, braille embossed keypads, and the corresponding software. Little if any existing accessibility features of SCO units are designed to accommodate customers who require wheelchair access. This is largely because in order to make wheelchair accessibility accommodations, manufacturers would need to substantially redesign conventional SCO units and their corresponding peripherals.

As will be demonstrated herein and below, an accessibility SCO or SST (hereinafter "SCO" and "SST" may be used interchangeably and synonymously) is provided and formed through selectable configurations of modular devices and modular accessibility modules. The SSTs include physical layouts that accommodate wheelchair users. A host device is included within a housing of at least one peripheral device. The host device has a processor and executable instructions for a transaction manager that when executed by the processor interacts with peripheral devices and processes a self-service transaction on a given SST. The SST can be formed through custom selection of peripheral devices and accessory modules that are arranged in custom configurations. Some peripherals can be integrated within, attached to, or affixed to one or more accessory modules. Some accessory modules provide support surfaces for handling items of a customer during self-checkouts. At lease one accessory module provides clearance for a wheelchair to pull up under and adjacent to a primary operating surface for self-checkouts such that peripheral devices of a given SST are accessible to the customer from the primary surface. Each configuration includes a physical layout that can accommodate wheelchair access for performing a self-service transaction on the SST while a customer is seated in the wheelchair.

As used herein the terms "customer," "consumer," and "user" may be used interchangeably and synonymously. These terms may connote—individually, in any combination, and/or when modified by another term/phrase such as "wheelchair"—shoppers who have a disability and rely on a support mechanism such as a wheelchair, a cane, a walker, or the like for support while shopping at a store.

Figure 1A:
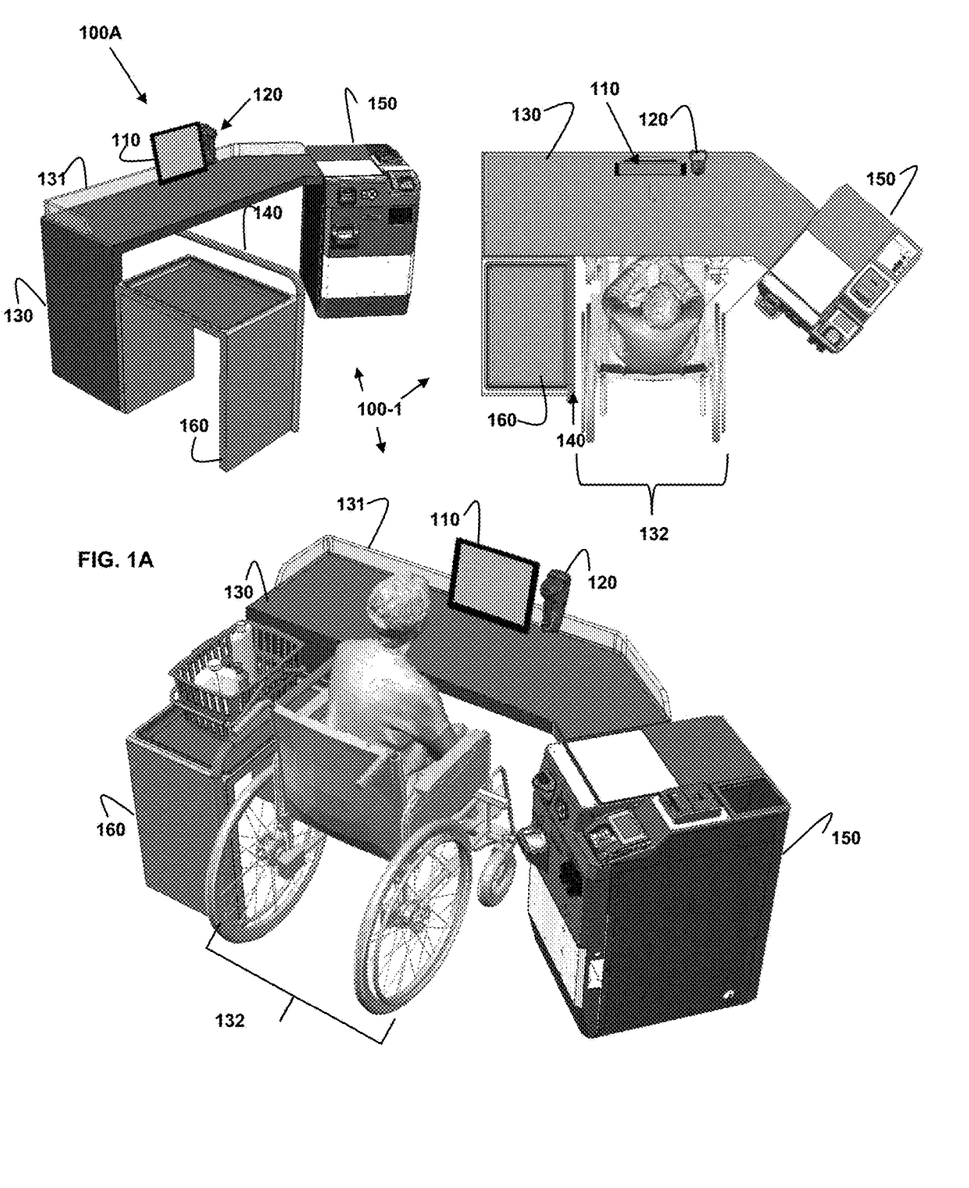
FIG. 1A is a diagram depicting different views of a self-service terminal (SST) formed in a custom configuration from selectable devices and accessory modules, according to an example embodiment.

FIG. 1A is a diagram 100A depicting different views of an SST 100-1 formed in a custom configuration from selectable devices and accessory modules, according to an example embodiment. The first view of the SST 100-1 is illustrated as the leftmost diagram and includes no customer. The SST 100-1 includes modular peripheral devices that include a touch display 110, a handheld scanner 120, and a media dispenser/acceptor 150. The media dispenser/acceptor 150 includes integrated peripherals associated with verifying and processing valuable media such as currency and other peripherals that are attached or integrated into the media dispenser/acceptor 150. In addition, the media dispenser/acceptor 150 can also include an alternative input device, sometimes known as a universal navigator or uNav. The uNav includes 4 tactile buttons for up, down, left, and right arranged in a diamond shape, with a central button for activating the currently selected option. This also includes an audio jack for private audio, a volume button for controlling this audio, and tactile markings to aid the user in locating each element. The uNav reduces the need for the user to reach to the touchscreen and offers tactilely discernible input and private audio for the benefit of those with low visual acuity. (The other peripherals of media dispenser/acceptor 150 are discussed below with the views of SST 100-2 shown in FIG. 1B.)

The accessory modules of the SST 100-1 include a side table 160, a primary workspace desk or table 130 having an item spill retention shelf 131, and a customer grab/support bar or rail 140. A customer can place a basket of their items on side shelf 160 to begin a transaction at SST 100-1, as shown in the bottom view. The customer can use grab bar 140 to pull their wheelchair up to the primary workspace desk 130.

Grab bar 140, primary workspace desk 130, and media dispenser/acceptor 150 of SST 100-1 are arranged such that clearance 132 permits the wheelchair to be pulled up to the primary workspace desk 130 with the customer's basket on an opposite side of grab bar 140 and with the customer directly facing touch display 110. Grab bar 140 can also assist customers that need extra support while standing. To the right of the display and reachable to the customer is handheld scanner 120 for the customer to grab and operate in one hand while the other hand of the customer selects items from their basket to scan the items' barcodes. The customer can set the handheld scanner 120 down and use touch display 110 to interact and provide input to transaction interface screens being presented on touch display 110 during the transaction. When payment is needed, the customer can reorient their wheelchair slightly to face media dispenser/acceptor 150 and access the payment and valuable media peripherals associated with media dispenser/acceptor 150.

Rightmost view of SST 100-1 is a top-down view that illustrates that the customer can pull the wheelchair up to a front edge of primary workspace desk 130. A front portion of the wheelchair fits under the top surface of primary workspace desk 130. The width of primary workspace desk 130 and placement of touch display 110 along with the position of the wheelchair adjacent to the front edge of desk 130 ensures the customer can easily reach touch display 110 and operate handheld scanner 120.

It is to be noted that at least one of the peripheral devices illustrated in FIG. 1A and as illustrated below with FIGS. 1B-1E includes a host device integrated within a housing of the corresponding peripheral. The host device is connected or interfaced to through cabling and or through one or more wireless transceivers to each of the peripherals. The host device includes at least one processor and executable instructions that the processor executes to perform transaction operations, interact with the peripherals, and control the peripherals during a transaction. The host device can be integrated within a housing associated with touch display 110, media dispenser/acceptor 150, combined card reader and keypad 125 (identified in FIG. 1B below), and/or handheld scanner 120. Each of the SSTs discussed herein include a host device integrated into one of the above-mentioned peripheral devices.

Figure 1B:
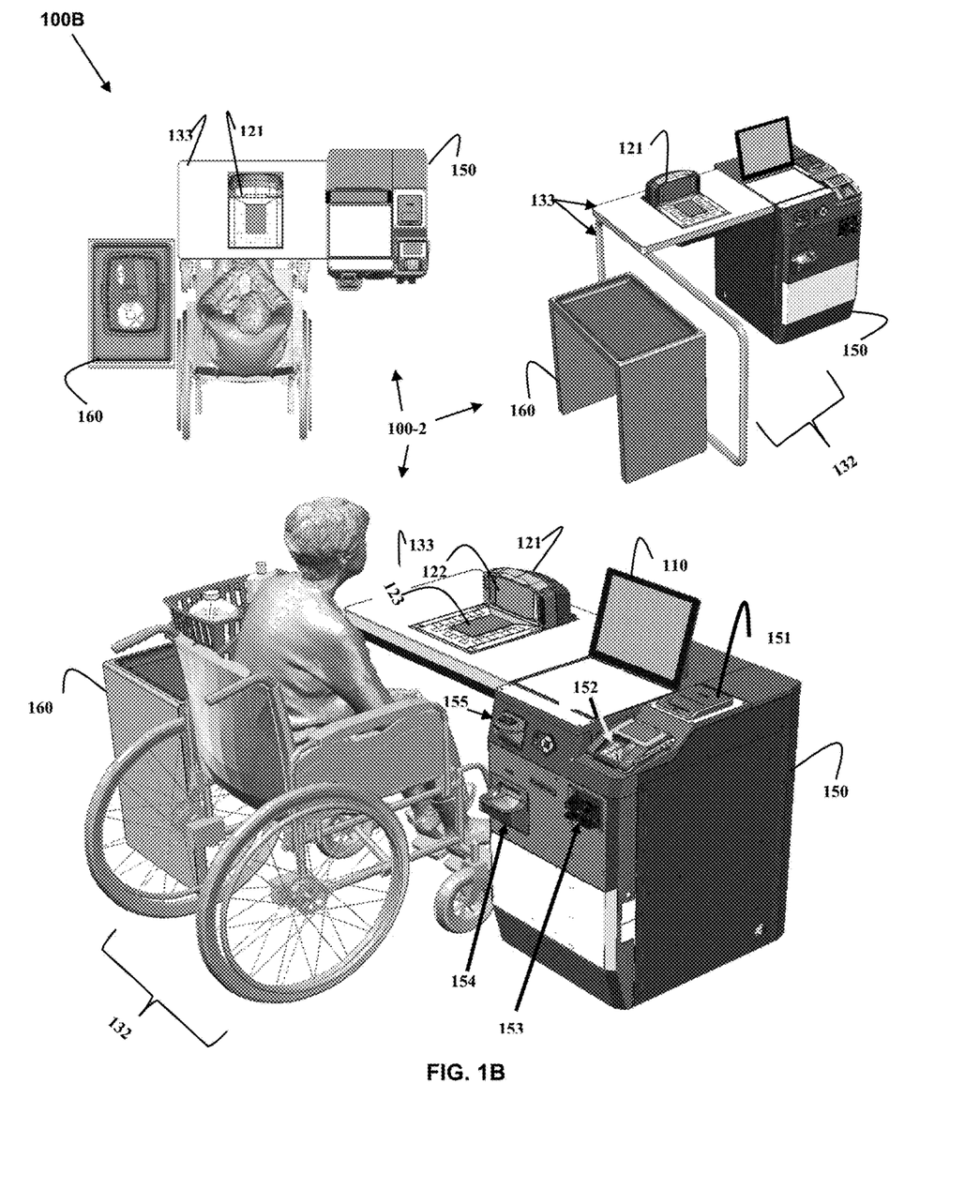
FIG. 1B is diagram depicting different views of another SST formed in a custom configuration from selectable devices and accessory modules, according to an example embodiment.

FIG. 1B is diagram 100B depicting different views of another SST 100-2 formed in a custom configuration from selectable devices and accessory modules, according to an example embodiment. The SST 100-2 includes peripheral devices for a touch display 110, a bioptic scanner 121, and a media dispenser/acceptor 150. Bioptic scanner 121 includes a vertical scan window 122 and a horizontal scan window 123. In an embodiment, the vertical scan window 122 also includes an integrated produce weigh scale to weigh produce items of the customer. Media dispenser/acceptor 150 includes integrated or attached peripherals for a receipt printer 151, a combined card reader and keypad 152, a media acceptor/dispenser chute 153, a coin acceptor/dispenser chute 154, an alternative input device, sometimes known as a uNav, and a near field communication (NFC) transceiver for contactless card reading. Media dispenser/acceptor 150 can also include touch display 110 that is integrated into media dispenser/acceptor 150 or attached to media dispenser/acceptor 150.

The accessory modules for SST 100-2 include a side table and a combined primary workspace desk that itself includes as a leg structure a grab bar 133 as a single accessory module 133. Again, appropriate clearance 132 is provided for wheelchair access up to workspace desk 133. Workspace desk 133 includes a manufactured recess in substantially a center of the top surface that is sized to securely fit and hold bioptic scanner 121 such that a top surface associated with horizontal scan window 123 is substantially inline and smooth with the remaining portion of the top surface for workspace desk 133. This permits the customer to grab items in their basket resting on shelf 160 and pass the items over horizontal scan window 123 and in front of vertical scan window 122 for the bioptic scanner 121 to read and remote the item code for the item to the host device of SST 100-2. The customer can look slightly to their right to view the scanned item details in the transaction screens presented on touch display 110. In an embodiment, touch display 110 can be pivoted or rotated towards the customer. When payment is needed, the customer collects the items, reorients their wheelchair slightly to the right or directly in front of media dispenser/acceptor 150, and accesses payment peripherals associated with media dispenser/acceptor 150.

Notice that the orientation of media dispenser/acceptor 150 is directly in-line with an end of workspace desk 133 in the views of SST 100-2 and the orientation of media dispenser/acceptor 150 is at an angle with respect to an end of workspace desk 130 and the customer in the views of SST 100-1 of FIG. 1A. It is noted that no angle orientation or any desired angle of orientation of the media dispenser/acceptor 150 (including the absence of an angled orientation) can be arranged to support accessibility for the customer and/or to minimize the physical footprint of the SSTs at a given store so long as clearance 132 is available for wheelchair access. Thus, media dispenser/acceptor 150 of SST 100-2 can be set at an angle with resect to workspace desk 133 such that touch display 110 and payment peripherals of media dispenser/acceptor 150 are facing the customer when in front of bioptic scanner 121 at an angle.

Figure 1C:
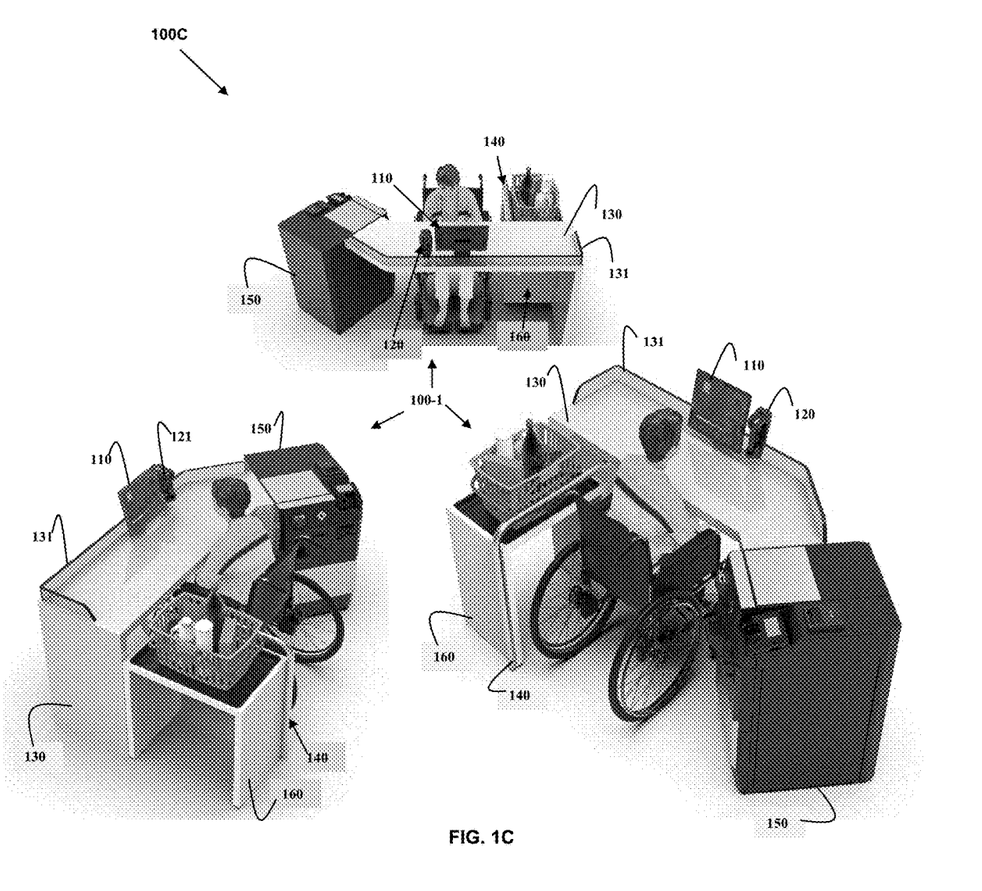
FIG. 1C is a diagram depicting additional views of the SST of FIG. 1A, according to an example embodiment.

FIG. 1C is a diagram 100C depicting additional views of the SST 100-1 of FIG. 1A, according to an example embodiment. The additional views are intended to illustrate that a top surface of workspace desk 130 can be extended to provide a greater surface area for the customer to handle items during a transaction. In fact, the shape, length, and width of a top surface of workspace desk 130 and 133 can be manufactured according to retailer specifications for an optimal workspace for disabled customers.

Figure 1D:
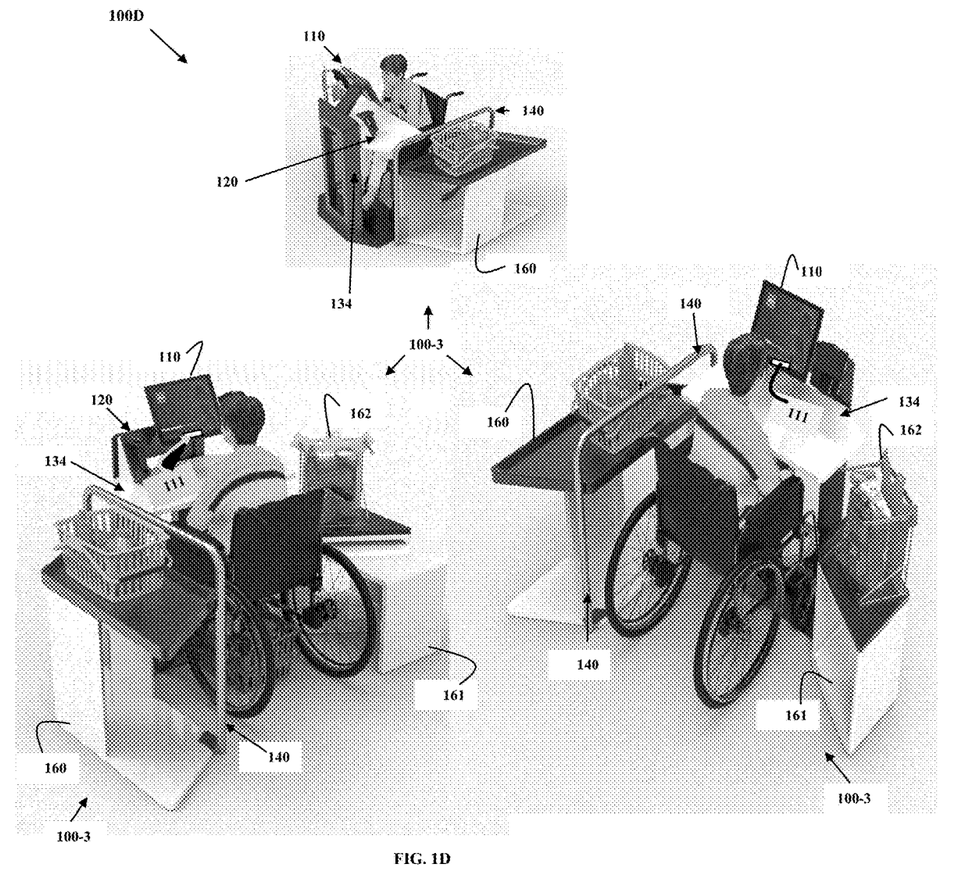
FIG. 1D is a diagram depicting different views of, yet another SST formed in a custom configuration from selectable devices and accessory modules, according to an example embodiment.

FIG. 1D is a diagram 100D depicting different views of yet another SST 100-3 formed in a custom configuration from selected devices and accessory modules, according to an example embodiment. The SST 100-3 includes peripheral devices for a touch display 110 with an integrated card reader 111 at a bottom of touch display 110 and a handheld scanner 120.

The accessory modules of SST 100-3 include a side table 160, a second side table 161, a workspace desk 134, and a grab support bar 140. Workspace desk 134 includes a front elevated vertical support member and a horizontal surface attached to a middle portion of the vertical support member. The horizontal surface provides the item handling surface for the customer. A top portion of the vertical support member includes a display holder for touch display 110 within integrated card reader 111. The physical footprint of workspace desk 134 is substantially smaller than workspace desk 130 of SST 100-1 and workspace desk 133 of SST 100-2. The second side table 161 is configured to hold or affix on its top surface a bag rack 162. The side table 160 provides an area where the customer can place their basket of items.

The customer is directly viewing touch display 110 and the transaction screens generated by the host device of SST 100-3. A customer can grab handheld scanner 120 in one hand and use another hand to grab an item from their basket sitting on side shelf 160. The customer may scan the item barcode, view the corresponding item details in the corresponding transaction screen, and place the item in a bag of bag rack 162 on the second side shelf. When payment is needed, the customer inserts their payment card into card reader 111. The card reader 111 can be a chip card reader, a magnetic strip card reader, and/or a contactless card reader. The shape and dimensions of the accessory modules can be manufactured according to the needs and desires of the retailer.

Figure 1E:
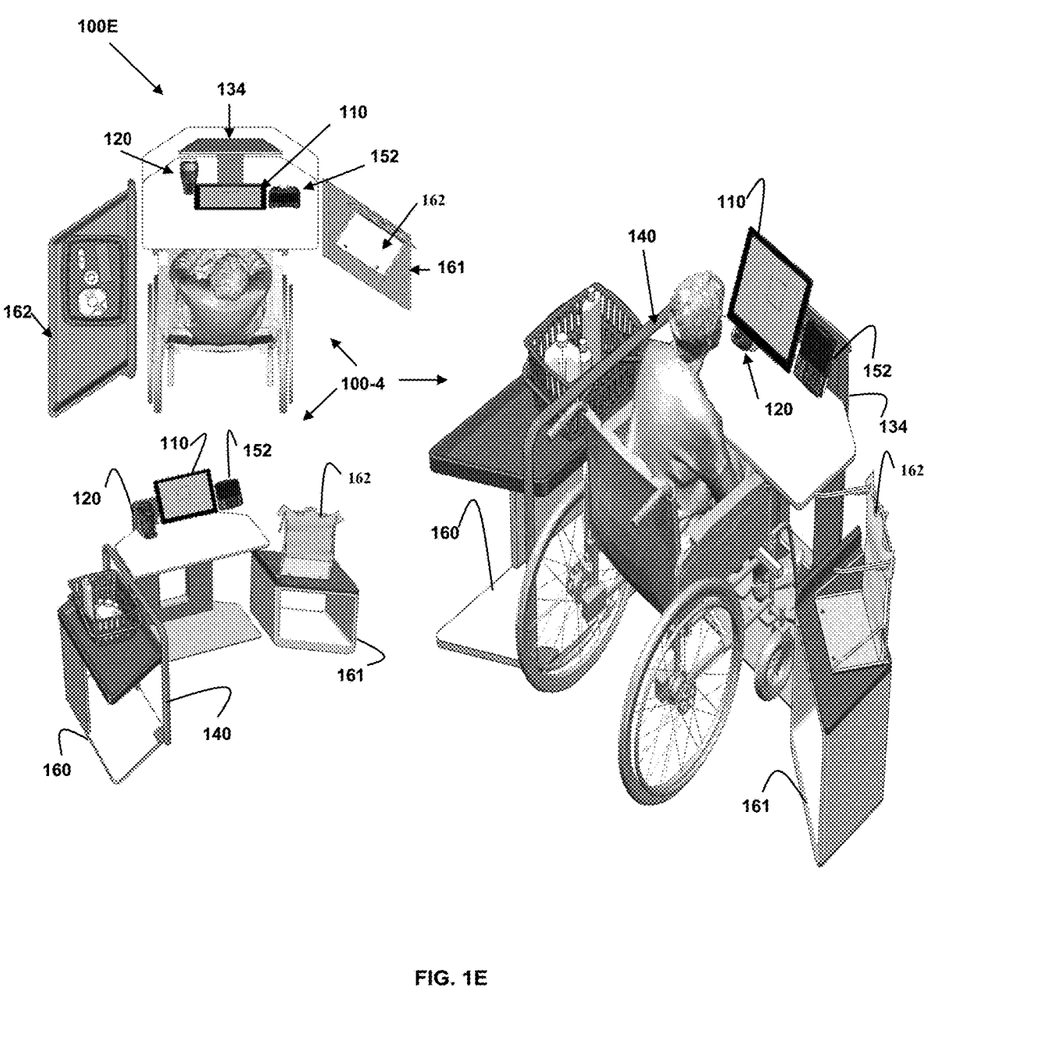
FIG. 1E is a diagram depicting different views of the SST of FIG. 1D with an additional selectable device, according to an example embodiment.

FIG. 1E is a diagram 100E depicting different views of the SST 100-3 of FIG. 1D with an additional selectable device, according to an example embodiment. The views of SST 100-3 illustrate that a combined card reader and keypad 152 can be added and the integrated card reader of touch display 110 removed from the version of SST 100-3 illustrated in FIG. 1D to form a new version of SST 100-3 as illustrated in the views of FIG. 1E. The combined card reader and keypad is adjacent to a side of touch display 110 and may be mounted or affixed to a top portion of the vertical member of workspace desk 134 along with mounted touch display 110.

Notably, any of the accessory modules discussed in FIGS. 1A-1E can be arranged, sized, and manufactured according to the physical space limitation and accessibility features of a given retailer. The accessory modules are not static and can be dynamically arranged in any desired layout. Fewer or more accessory modules can be removed or added to any configuration of an SST. Similarly, the peripheral devices are portable and can be interfaced to the host device of the corresponding SST in any desired arrangement conducive to accessibility and footprints desired by a given retailer. Thus, more or less peripherals can be added and removed from any SST.

In FIGS. 1D-1E workspace 134 can be height adjustable, which can be manually adjusted or automatically adjusted through sensors. The sensors can be used to determine the user's/customer's height to perform the automatic adjustment. Moreover, the display angle can be adjusted according to the height and position of the user/customer at the workspace 134. In an embodiment, a customer's loyalty card can be scanned to automatically adjust the height and display angle to predefined settings associated with the customer's loyalty account adding personalization to those with disabilities.

Also, it is to be noted that in FIGS. 1D-1E a media dispenser/acceptor 150 can be added to SSTs 100-3 and 100-4. This permits SSTs 100-3 and 100-4 to perform currency-based transactions.

In an embodiment, the arrangement and selection of a host device, peripherals, composite peripherals, and access modules also provides disability access to those customers with disabilities other than wheelchair customers. For example, uNav peripheral device can be added to provide accessibility to the sight-impaired; sensors can be added to adjust the clearance area 132, height of the workspaces 130, 133, and/or 134, and/or angle of display 120 relative to the customer; grab bar 140 can be used to provide support to customers that require or need assistance while standing; the height of the workspaces 130, 133, and/or 134 and/or angle of display 120 can be automatically adjusted based on settings stored in a customer's loyalty account that are obtained when the customer scans a loyalty card; etc.

In an embodiment, side tables 160 and/or 161 can include weigh scales (e.g., a type of peripheral device) either integrated into a top surface of tables 160 and/or 161 or rested on the top surface so as to cover nearly all of the top surface. The weigh scales can be interfaced to the host device via wireless transceivers or cabling. The weigh scales are used by the host device for security to ensure item recorded weights match item codes scanned and/or to ensure bagged items match expected weights of bagged items. This can be added for security purposes to identify theft.

In an embodiment, peripheral cameras can be added to surfaces of the accessory modules, surfaces of the other peripherals, and/or integrated within the other peripherals. The host device can perform image processing on images provided by the cameras for purposes of matching scanned item barcodes to items identified through the image processing. This can be added for security purposes to identify theft.

In an embodiment, a server is provided with an Application Programming Interface (API) and a retailer interface.

The retailer uses to interface to request a custom SST from an enterprise associated with the server. The retailer provides the features that are needed, such as ability to pay with currency, pay with just card, scan both horizontally and/or vertically, handheld scanning, bag weighing, produce weighing, etc. The retailer also provides disabilities that the retailer desires to accommodate, such as wheelchair access, standing support access, visually impaired, hearing impaired, etc. Furthermore, the retailer can provide the dimensions of the physical space needed for the SST. Configuration manager instructions on the server receives the retailer's inputs for features of the SST, disabilities desired to be covered, and/or physical space dimensions available for the SST via a website through which the interface is provided. The instructions then select configurations that meet the inputs for one or more SSTs and their corresponding peripheral devices, composite peripheral devices, and accessory modules; a host device is included with one of the peripheral devices and/or composite peripheral devices. The available SSTs and each of their corresponding devices and accessory modules are then presented through the interface of the website to the retailer and the retailer selects an SST. The corresponding devices and accessory modules are then ordered, manufactured, and shipped to the retailer along with instructions for each of the various layouts available with the selected SST. The instructions for the various layouts can also be presented through the interface via the website after the corresponding devices and accessory modules for the selected SST are onsite at the retailer's store.

Figure 2:
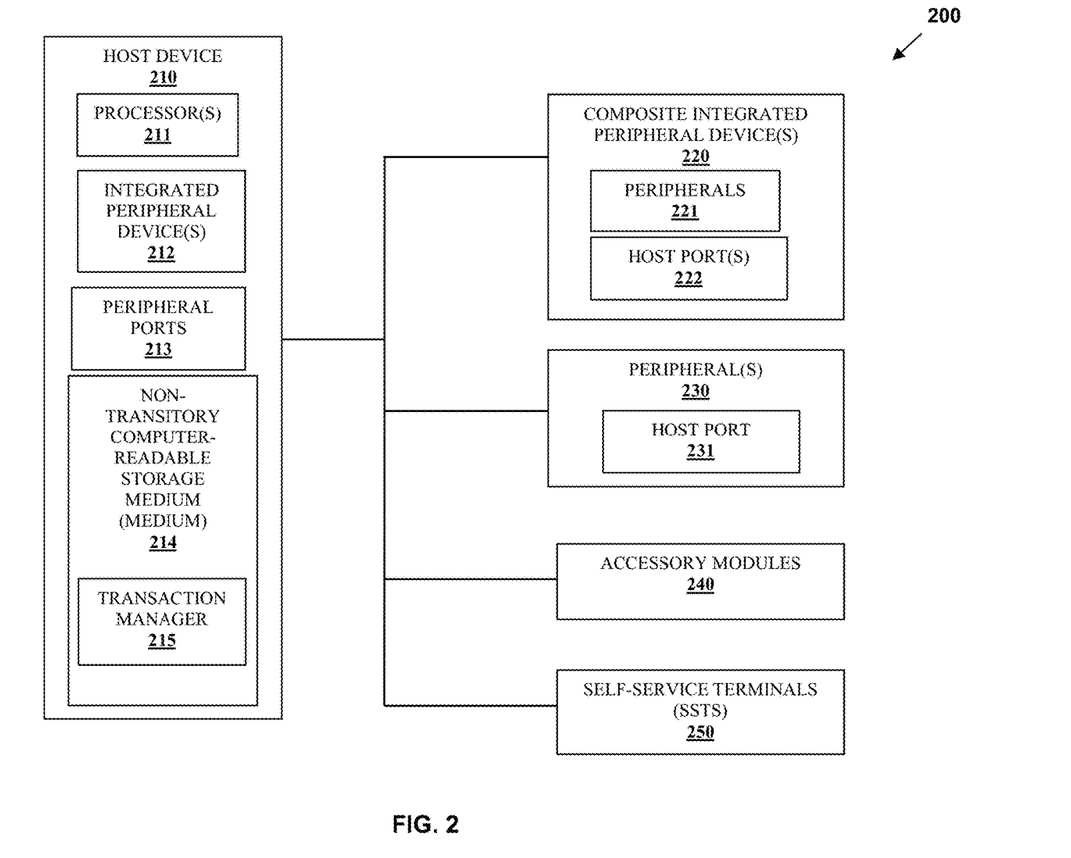
FIG. 2 is a diagram of a system for devices and accessory modules that can be assembled in custom configurations to form an operational SST, according to an example embodiment.

FIG. 2 is a diagram of a system 200 for devices and accessory modules that can be assembled in custom configurations to form an operational SST, according to an example embodiment. It is to be noted that the components are shown schematically in greatly simplified form, with only those components relevant to understanding of the embodiments being illustrated.

Furthermore, the various components (that are identified in FIG. 2) are illustrated and the arrangement of the components is presented for purposes of illustration only. It is to be noted that other arrangements with more or fewer components are possible without departing from the teachings of accessibility SSTs with module devices and modules for customer configurations, presented herein and below.

System 200 includes a host device 210, a composite integrated peripheral device 220, peripherals 230, accessory modules 240, and SSTs 250. Host device 210 includes at least one processor 211, one or more integrated peripherals 212, peripheral ports 213, and a non-transitory computer-readable storage medium (hereinafter just "medium"). Optionally, host device 210 includes one or more wireless transceivers (not shown in FIG. 2). Medium includes executable instructions for transaction manager 215, which when executed by processor 211 cause the processor to perform operations discussed herein and below for transaction manager 215.

Each composite integrated peripheral device 220 includes two or more peripherals 221 and host ports 222. Optionally, a composite integrated peripheral device 220 may include one or more wireless transceivers (not shown in FIG. 2). Each standalone peripheral 230 includes a host port 231; optionally a standalone peripheral 230 includes one or more wireless transceivers (not shown in FIG. 2).

Accessory modules 240 include side tables 160, 161, workspace desk 130, 131, 134, grab support bar 140, and/or bag holder 162. The accessory modules 240 can be manufactured and sized in any desired shapes and dimensions. Example accessory modules 240 where illustrated in FIGS. 1A-1E above.

The SSTs 240 include 100-1, 100-2, 100-3, and 100-4 as discussed above with FIGS. 1A-1E. The SSTs 250 are formed by custom selecting a host device 210, integrated peripheral device(s), and peripheral(s) 230 along with custom selection of accessory modules 240. The peripherals 221 and 230 are connected via cabling from their host ports 222 and 231 to corresponding peripheral ports 213 on the host device. In an embodiment, the connections are achieved via wireless transceivers of the peripherals 221 and 230 to wireless transceivers of host device 210. Thus, any given SST 250 can include wired connections, wireless connections, or a combination of wireless and wired connections between the host device 210 and the peripherals 221 and 230.

The host device 210 includes one or more integrated peripherals 212. A single housing includes the host device 210 and the integrated peripherals 212. The integrated peripherals 212 are connected within the housing from their host ports to the corresponding peripheral ports 213 of the host device 210. Thus, the host device 210 may share a same housing with any one of a touch display 110, a touch display with integrated card reader, a handheld scanner 120, a bioptic scanner 121, a bioptic scanner 120 with integrated weigh scale, a media dispenser/acceptor 150, and a combined card reader and keypad 152.

A host device 210 is selected with at least one peripheral 230, optionally with at least one integrated peripheral device 230, and multiple accessory modules 240. The host device 210 is connected to the at least one peripheral 230 and optionally connected to peripherals 221 of any composite integrated peripheral device 220 to form a custom configuration of host device 210, integrated peripherals 212, the at least one peripheral 230, and optionally the peripherals 221. The host device 210, the at least one peripheral 230, and optionally the composite integrated peripheral device 220 are arranged on or relative to the accessory modules 240 in a desired layout to form a desired SST 250. At least one peripheral of SST 250 is a touch display 110.

During operation of any given SST 250, transaction manager 215 interacts with the corresponding peripherals 212, 231, and optionally 221 to process a self-service transaction on behalf of a customer. Inputs are received by transaction manager 215 from peripherals 212, 231, and optionally 221 and transaction manager 215 updates transaction interface screens presented on touch display 110.

In an embodiment, the composite integrated peripheral devices 220 can include touch display 110 with integrated card reader 111, bioptic scanner 121, bioptic scanner 121 with integrated weigh scale, combined card reader and keypad 152, and/or media dispenser/acceptor 150.

In an embodiment, the standalone peripherals 230 can include touch display 110; handheld scanner 120; a receipt printer 151; a weigh scale integrated into, attached to, or rested upon a surface of an accessory module 240; and a camera affixed to a surface of a housing of host device 210, composite integrated peripheral device 220, peripheral 230, or affixed to a surface of an accessory module 240.

A retailer decides on what features are desired for an accessibility SST 250 and the desired footprint of the SST 250 for wheelchair access. For example, a retailer may select an SST 250 with just payment through a card reader; in such an example the appropriate host device 210 with integrated peripherals 212 and needed peripheral(s) 230 are selected along with accessory modules 240. The corresponding peripherals are connected to the host device 210 and arranged with accessory modules 240 to form an operational SST 250 as is shown in SST 100-3 of FIG. 1D, which includes a host device 210 integrated within a touch display 110 with integrated card reader 111 and handheld scanner 120 arranged as shown on accessory modules 134, 140, 160, 161, and 162. In this example, if the touch display 110 that includes the host device 210 does not include the integrated card reader, the retailer may elect to go with SST 110-4 as shown in FIG. 1E wherein a composite integrated peripheral device 220 is added as combined card reader and keypad 152 to replace the missing card reader from touch display 110.

It is noted that the above-presented example is just one of many that can be used to form an operational accessibility SST 250 using system 200. The host device 210, composite integrated peripheral device 220, peripherals 230, and accessory modules 240 can be custom-selected based on desired self-service transaction features, accessibility options, and accessory modules 240 in any combination where the corresponding peripherals are interfaced to host device 210 and arranged to form any of the SSTs 100-1, 100-2, 100-3, 100-4, or to form modified versions of those corresponding SSTs. The devices 210, 220, and 230 and the accessory modules 240 are modular and can be connected in any desired configuration and arranged in any desired layout.

Figure 3:
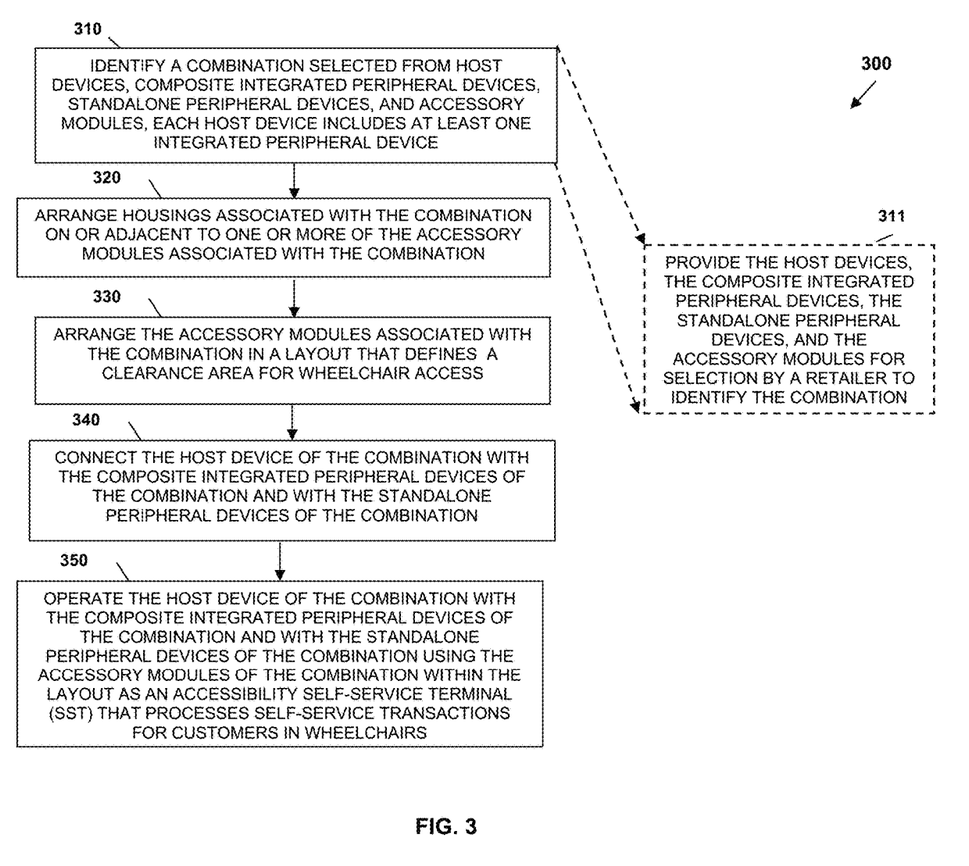
FIG. 3 is a flow diagram of a method for assembling devices and accessory modules in custom configurations to operate an SST, according to an example embodiment.

FIG. 3 is a flow diagram of a method 300 for assembling devices and accessory modules in custom configurations to operate an SST, according to an example embodiment.

At 310, a combination is identified. The combination is a selection made from host devices 210, composite integrated peripheral devices 220, standalone peripheral devices 230, and accessory modules 240. Each host device 210 includes at least one integrated peripheral device 212.

In an embodiment, at 311, the host devices 210, the composite integrated peripheral devices 220, the standalone devices 230, and the accessory modules 240 are provided to a retailer for selection. The retailer identifies the combination based on the selections made, a given selection at least includes a host device 210 and at least one standalone peripheral device 230 as was discussed above with system 200.

At 320, housings associated with the combination on or adjacent to one or more of the accessory modules 240 associated with the combination. That is, the housings of 210, 220, and 230 can be mounted on, integrated within recesses of, affixed to, or placed adjacent to the accessory modules 240.

At 330, the accessory modules 240 associated with the combination are arranged in a layout that defines a clearance area 132 for wheelchair access. That is, the accessory modules 240 and optionally combined with a selected composite integrated peripheral device, such as media dispenser/acceptor 150 define an opening or clearance area 132 for which a wheel chair can slide into or fit within to perform self-service transactions.

At 340, the host device 210 of the combination is connected with the composite integrated peripheral devices 220 of the combination and is connected with the standalone peripheral devices 230 of the combination. This can include wired cabling of the corresponding ports or software connection via wireless transceivers as was discussed above.

At 350, the host device of the combination with its connected composite integrated peripheral devices of the combination and with its connected standalone peripheral devices 230 of the combination are operated using accessory modules 240 as an accessibility SST 250. The SST 250 processes self-service transaction for customers in wheelchairs.

In an embodiment, the device that executes the SST indicator device manager is SST 120 or terminal 210. In an embodiment, the SST indicator device manager is one or more of display manager 215 and/or display manager 216.

At 310, the SST indicator device manager identifies a status that changed for an SST 120 or 210. The status can be any of the above-referenced terminal statuses.

At 320, the SST indicator device manager obtains a media selection based on rules relevant to the status. That is, the SST indicator device manager maintains a set of rules corresponding to light colors and/or light effects for status light strips 112 and/or 112A-112D. The rules also identify media selections that include text, graphics, images, animation, and video associated with each status.

At 330, the SST indicator device manager instructs a terminal indicator device peripheral 111A and/or 220 to illuminate colors or cause light effects of status lights 112 and/or 112A-112D from a status pole 113 situated above the SST 120 and/or 210 based on the status. The terminal indicator device peripheral 111A and/or 220 attached to the status pole 113 in any of the manners discussed above with FIGS. 1A-1F.

At 340, the SST indicator device manager instructs the terminal indicator device peripheral 111A and/or 210 to play a second media selection that is not relevant to the status on a second display 111B of the terminal indicator device peripheral 111A and/or 220 while the media selection of 330 plays on a first display 111C of the terminal indicator device peripheral 111A and/or 220. This illustrates that the two displays 111B and 111C of indicator device 111A and/or 220 can be separately and independently controlled and can play different media selections on each display 111B and 111C.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner. The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. An accessibility self-service terminal (SST), comprising:

at least one host device that comprises at least one integrated peripheral device;

at least one standalone peripheral device; and accessory modules;

wherein the at least one standalone peripheral device is connected and interfaced to the host device;

wherein a single housing for the host device comprises the at least one integrated peripheral device;

wherein the single housing and a standalone housing are custom arranged on one or more of the accessory modules to form a layout that defines a clearance area adapted for seated access to the accessibility SST;

wherein the accessory modules include a workspace desk that is elevated over the clearance area and a grab support bar;

wherein the layout is configured to accommodate wheelchair access for performing a self-service transaction on the SST while a customer is seated in a wheelchair;

wherein the host device interacts with the at least one integrated peripheral device and the at least one standalone peripheral device to process self-service transactions;

the workspace desk includes sensors for automatically adjusting a height of the workspace desk and an angle of a display relative to the customer based on detecting a height of a customer.

2. The accessibility SST of claim 1, wherein the at least one integrated peripheral device is a touch display.

3. The accessibility SST of claim 2, wherein the at least one integrated peripheral device is a touch display and a card reader.

4. The accessibility SST of claim 2, wherein the at least one standalone peripheral device is a handheld scanner.

5. The accessibility SST of claim 1 further comprising, a composite integrated peripheral device that comprises additional peripherals connected and interfaced to the host device, wherein the composite integrated peripheral device arranged on or adjacent to at least one accessory module to provide a modified layout.

6. The accessibility SST of claim 5, wherein the composite integrated peripheral device is a media dispenser/acceptor, and the additional peripherals are currency and coin accepting and dispensing peripherals.

7. The accessibility SST of claim 6, wherein the additional peripherals further include a combined card reader and keypad peripheral, a receipt printer, a currency dispenser/acceptor chute, a coin dispenser/acceptor chute, and a near field communication (NFC) transceiver.

8. The accessibility SST of claim 7, wherein the integrated peripheral device is a touch display mounted on a top surface of the media dispenser/acceptor.

9. The accessibility SST of claim 1, wherein the accessory modules further include a side shelf situated on an outside portion of the grab support bar and a first side of the clearance area.

10. The accessibility SST of claim 9, wherein the accessory modules further include a second side shelf situated on a second and opposite side of the clearance area.

11. The accessibility SST of claim 10, wherein the accessory modules further comprise a bag holder and dispenser situated on a top of the second side shelf.

12. The accessibility SST of claim 1, wherein one or more of the accessory modules are portable and adapted to be rearranged to modify the layout.

13. A system, comprising:

a host device integrated in a peripheral housing of a first peripheral device, wherein the host device comprises a processor and an integrated connection within the peripheral housing to the first peripheral;

a plurality of composite integrated peripheral devices that comprise second peripheral devices;

a plurality of standalone peripheral devices that comprise third peripheral devices;

a workspace desk; and a grab bar support;

wherein the host device and one or more selections from the second peripherals and the third peripherals are configured as an accessibility self-service terminal (SST), the selected second peripherals and the selected third peripherals adapted to connect to the host device, the host device configured to process self-service transactions on the accessibility SST using the first peripheral device, the selected second peripherals, and the selected third peripherals;

wherein the peripheral housing and second housings for the selected second peripherals and the third peripherals are arranged on, affixed to, or placed adjacent to the workspace desk and the grab bar support in a layout that supports custom access to the accessibility SST;

wherein the workspace desk is elevated over a clearance area that permits a wheelchair to be pulled up to the workspace desk;

wherein the layout is configured to accommodate wheelchair access for performing a self-service transaction on the accessibility SST while a customer is seated in a wheelchair;

the workspace desk includes sensors for automatically adjusting a height of the workspace desk and an angle of a display relative to the customer based on detecting a height of the customer.

14. The system of claim 13, wherein the selected second peripherals comprise a bioptic scanner and a media dispenser/acceptor, wherein the bioptic scanner comprises a vertical scanner with a vertical scan window and a horizontal scanner with a horizontal scan window, wherein the media dispenser/acceptor comprises media handling peripherals, a combined card reader and keypad, a receipt printer, a currency dispenser/acceptor chute, a coin dispenser/acceptor chute, and an near field communication (NFC) transceiver.

15. The system of claim 14, wherein the bioptic scanner further includes a weigh scale integrated under the horizontal scan window.

16. The system of claim 15, wherein the bioptic scanner is adapted to be inserted into a recess at substantially a center of the workspace desk so that the horizontal scan window is substantially flush with a top surface of the workspace desk.

17. The system of claim 16, wherein the media dispenser/acceptor and acceptor further includes a touch display mounted to a top surface of the media dispenser/acceptor and acceptor and adjacent to an end of the workspace desk, wherein the top surface of the media dispenser/acceptor substantially flush with the top surface of the workspace desk.

18. A method, comprising:

identifying a combination selected from host devices, composite integrated peripheral devices, standalone peripheral devices, and accessory modules, wherein each host device comprises at least one integrated peripheral device;

arranging housings associated with the combination on or adjacent to one of more of the accessory modules associated with the combination;

arranging the accessory modules associated with the combination in a layout that defines a clearance area for wheelchair access;

wherein the accessory modules include a workspace desk that is elevated over the clearance area and a grab support bar;

wherein the layout is configured to accommodate the wheelchair access for performing a self-service transaction on a self-service terminal (SST) while a customer is seated in a wheelchair;

connecting the host device of the combination to the composite integrated peripheral devices associated with the combination and the standalone peripherals associated with the combination; and operating the host device of the combination with the composite integrated peripheral devices of the combination and with the standalone peripheral devices of the combination using the accessory modules of the combination within the layout as an accessibility self-service terminal (SST) that processes self-service transaction for customers in wheelchairs;

the workspace desk includes sensors for automatically adjusting a height of the workspace desk and an angle of a display relative to the customer based on detecting a height of the customer.

19. The method of claim 18, wherein identifying further includes providing the host devices, the composite integrated peripheral devices, the standalone devices, and the accessory modules for selection by a retailer to identify the combination.

* * * * *